United States Patent
Jantunen et al.

(10) Patent No.: US 9,582,242 B2
(45) Date of Patent: Feb. 28, 2017

(54) METHOD AND APPARATUS FOR CREATING A MULTI-DEVICE MEDIA PRESENTATION

(71) Applicant: Nokia Technologies Oy, Espoo (FI)

(72) Inventors: Joni Jorma Marius Jantunen, Helsinki (FI); Kari Juhani Leppänen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/810,059

(22) Filed: Jul. 27, 2015

(65) Prior Publication Data

US 2015/0331652 A1    Nov. 19, 2015

Related U.S. Application Data

(63) Continuation of application No. 13/857,766, filed on Apr. 5, 2013, now Pat. No. 9,100,772.

(51) Int. Cl.
*H04W 8/00* (2009.01)
*G06F 3/147* (2006.01)
(Continued)

(52) U.S. Cl.
CPC ............... *G06F 3/147* (2013.01); *G06F 3/14* (2013.01); *G06F 3/1446* (2013.01); *G06T 15/503* (2013.01); *G09G 5/12* (2013.01); *H04N 21/25825* (2013.01); *H04N 21/41407* (2013.01); *H04N 21/4223* (2013.01); *H04N 21/42201* (2013.01); *H04N 21/42203* (2013.01);
(Continued)

(58) Field of Classification Search
USPC ... 455/63.1, 3.01, 456.1, 414.1, 556.1, 26.1, 455/422.1
See application file for complete search history.

(56) References Cited

U.S. PATENT DOCUMENTS

| 5,835,087 A | 11/1998 | Herz et al. |
| 5,920,854 A | 7/1999 | Kirsch et al. |

(Continued)

FOREIGN PATENT DOCUMENTS

EP    2503446 A2    9/2012

OTHER PUBLICATIONS

DIGINFO TV, "Pinch interface connects the displays of multiple devices simultaneously", Research, Nov. 1, 2012, retrieved on Oct. 19, 2015 from http://www.diginfo.tv/v/12-0202-r-en.php, 2 Pages.
(Continued)

*Primary Examiner* — Ganiyu A Hanidu
(74) *Attorney, Agent, or Firm* — Ditthavong & Steiner, P.C.

(57) ABSTRACT

An approach is provided for multi-device media presentation. One or more neighboring devices are detected based, at least in part, on a request to present one or more media files at at least one device. One or more media presentation capabilities of the one or more neighboring devices are determined. At least one subgroup of the at least one device, the one or more neighboring devices, or a combination thereof based, at least in part, on the one or more media presentation capabilities is formed. A layout comprising the at least one subgroup for a multi-device presentation of the one or more media files is determined.

20 Claims, 15 Drawing Sheets

(51) Int. Cl.
*H04N 21/414* (2011.01)
*G06T 15/50* (2011.01)
*G06F 3/14* (2006.01)
*H04N 21/258* (2011.01)
*H04N 21/422* (2011.01)
*H04N 21/4223* (2011.01)
*H04N 21/4788* (2011.01)
*G09G 5/12* (2006.01)

(52) U.S. Cl.
CPC ........ *H04N 21/4788* (2013.01); *H04W 8/005* (2013.01); *G09G 2356/00* (2013.01); *G09G 2370/025* (2013.01); *G09G 2370/042* (2013.01)

(56) References Cited

U.S. PATENT DOCUMENTS

| | | | |
|---|---|---|---|
| 7,027,801 | B1 | 4/2006 | Hall et al. |
| 7,065,345 | B2 | 6/2006 | Carlton et al. |
| 8,307,029 | B2 | 11/2012 | Davis et al. |
| 2009/0160731 | A1 | 6/2009 | Schuler et al. |
| 2009/0328087 | A1 | 12/2009 | Higgins et al. |
| 2010/0048242 | A1 | 2/2010 | Rhoads et al. |
| 2010/0144283 | A1 | 6/2010 | Curcio et al. |
| 2011/0060797 | A1* | 3/2011 | Balandin ............. G06Q 10/10 709/206 |
| 2011/0289437 | A1* | 11/2011 | Yuen ................. G06F 17/3089 715/762 |
| 2012/0062475 | A1 | 3/2012 | Locker et al. |
| 2012/0182384 | A1* | 7/2012 | Anderson ........... H04L 12/1827 348/14.09 |
| 2012/0206319 | A1* | 8/2012 | Lucero ............... H04N 21/4788 345/1.3 |
| 2013/0024418 | A1* | 1/2013 | Sitrick ................. G06F 17/241 707/608 |

OTHER PUBLICATIONS

Notification of Transmittal of the International Search Report and the Written Opinion of the International Searching Authority, or the Declaration; International Search Report and Written Opinion, for corresponding International Application No. PCT/FI2014/050226 dated Jun. 6, 2014, 14 Pages.

Office Action for corresponding European Patent Application No. 14779715.3-1905, dated Nov. 23, 2016, 9 Pages.

* cited by examiner

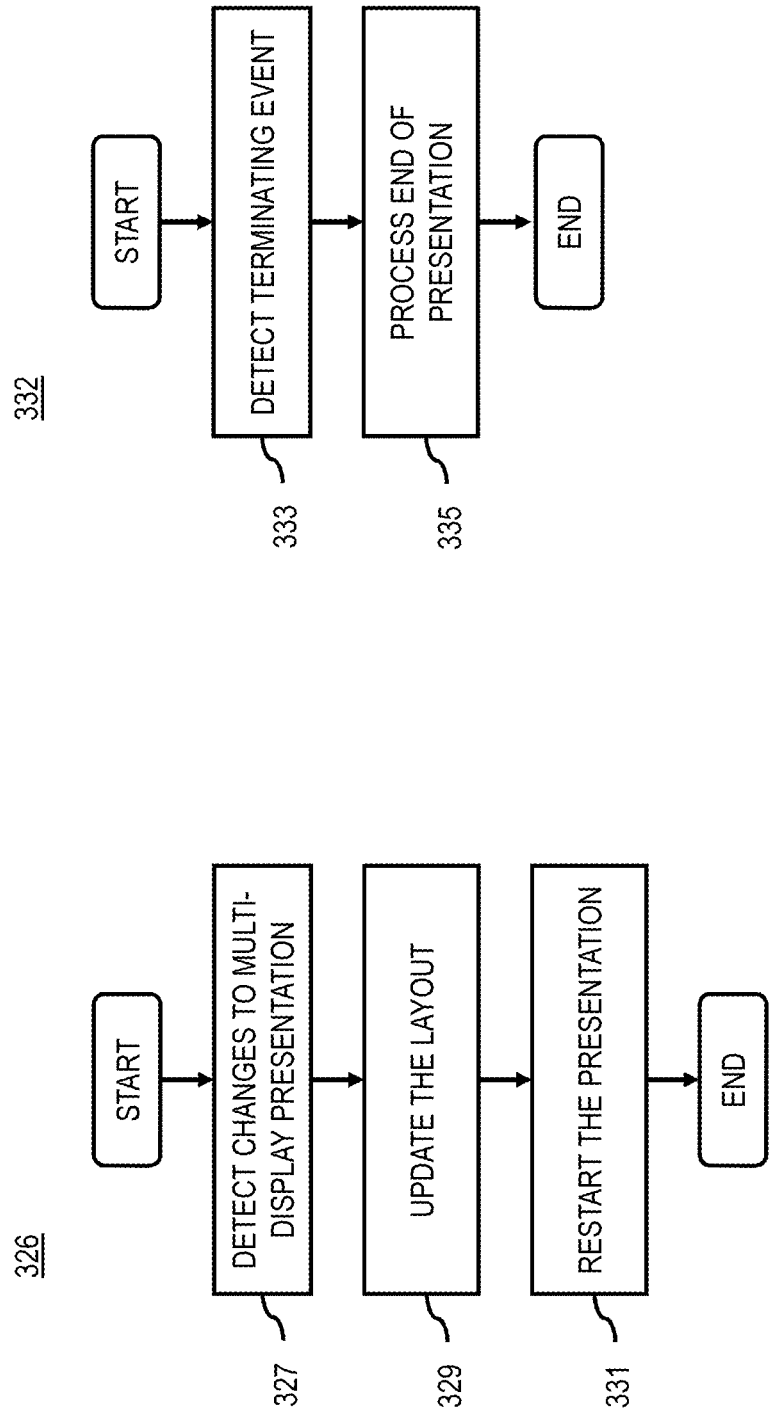

__US 9,582,242 B2__

METHOD AND APPARATUS FOR CREATING A MULTI-DEVICE MEDIA PRESENTATION

CROSS REFERENCE TO RELATED APPLICATIONS

This application is a continuation of and claims the right to the benefit of priority under 35 U.S.C. §120 to U.S. patent application Ser. No. 13/857,766, filed Apr. 5, 2013, titled: "METHOD AND APPARATUS FOR CREATING A MULTI MEDIA PRESENTATION," the entire disclosure of which is hereby incorporated by reference in its entirety for all purposes."

BACKGROUND

Mobile devices are rapidly becoming the computing device of choice for today's tech-savvy, on-the-go users. The increasing accessibility of high-quality media content on various mobile devices, including smartphones and other portable devices with high-resolution displays, allows users to individually receive the content via on-demand streaming or broadcast distribution. Historically, various applications are provided for content distribution. However, content viewing has remained tied to individual devices. Service providers and device manufacturers face significant technical challenges to support shared viewing among multiple devices, particularly with respect to small form factor devices such as mobile devices.

SOME EXAMPLE EMBODIMENTS

Therefore, there is a need for an approach for creating a multi-device media presentation.

According to one embodiment, a method comprises causing, at least in part, a detection of one or more neighboring devices based, at least in part, on a request to present one or more media files at at least one device. The method also comprises determining one or more media presentation capabilities of the one or more neighboring devices. The method also comprises causing, at least in part, a formation of at least one subgroup of the at least one device, the one or more neighboring devices, or a combination thereof based, at least in part, on the one or more media presentation capabilities. The method further comprises determining a layout comprising the at least one subgroup for a multi-device presentation of the one or more media files.

According to another embodiment, an apparatus comprises at least one processor, and at least one memory including computer program code for one or more computer programs, the at least one memory and the computer program code configured to, with the at least one processor, cause, at least in part, the apparatus to detect one or more neighboring devices based, at least in part, on a request to present one or more media files at at least one device. The apparatus is also caused to determine one or more media presentation capabilities of the one or more neighboring devices. The apparatus is also caused to form at least one subgroup of the at least one device, the one or more neighboring devices, or a combination thereof based, at least in part, on the one or more media presentation capabilities. The apparatus is further caused to determine a layout comprising the at least one subgroup for a multi-device presentation of the one or more media files.

According to another embodiment, a computer-readable storage medium carries one or more sequences of one or more instructions which, when executed by one or more processors, cause, at least in part, an apparatus to detect one or more neighboring devices based, at least in part, on a request to present one or more media files at at least one device. The apparatus is also caused to determine one or more media presentation capabilities of the one or more neighboring devices. The apparatus is also caused to form at least one subgroup of the at least one device, the one or more neighboring devices, or a combination thereof based, at least in part, on the one or more media presentation capabilities. The apparatus is further caused to determine a layout comprising the at least one subgroup for a multi-device presentation of the one or more media files.

According to another embodiment, an apparatus comprises means for causing, at least in part, a detection of one or more neighboring devices based, at least in part, on a request to present one or more media files at at least one device. The apparatus also comprises means for determining one or more media presentation capabilities of the one or more neighboring devices. The apparatus further comprises means for causing, at least in part, a formation of at least one subgroup of the at least one device, the one or more neighboring devices, or a combination thereof based, at least in part, on the one or more media presentation capabilities. The apparatus further comprises means for determining a layout comprising the at least one subgroup for a multi-device presentation of the one or more media files.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 3A-3F are flowcharts depicting processes for enabling multi-device media presentation, according to various embodiment;

DESCRIPTION OF SOME EMBODIMENTS

Examples of a method, apparatus, and computer program for multi-device media presentation are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "multi-device presentation" refers to any aural or visual presentation of content comprising a plurality of devices such that the content is scaled or otherwise adapted to the combined presentation area or presentation facilities of the plurality of devices. While visual presentation may frequently refer to video content, it may also include one or more static images. A static image may be presented as a single large image or as part of a collage of images composed to form a larger image. It is contemplated that the approach described herein may also be used for the alignment of multiple cameras and projectors. By way of example, the multiple cameras may be used to create a panoramic image. The multiple projectors may be used to individually project tiles of a larger presentation. Although various embodiments are described with respect to a multi-device presentation platform, it is contemplated that the approach described herein may be used with other decentralized or distributed components.

Figure 1:
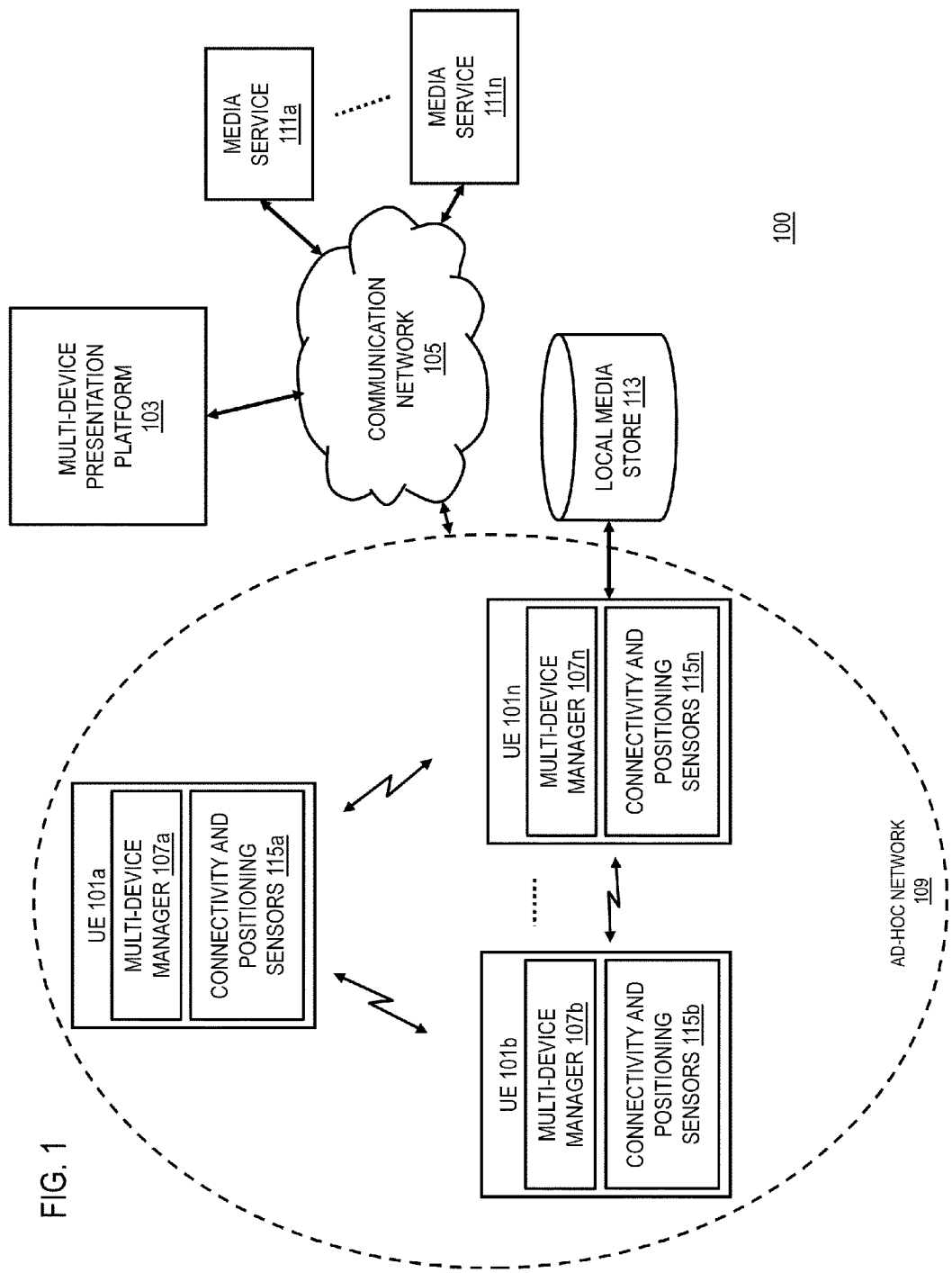
FIG. 1 is a diagram of a system capable of multi-device media presentation, according to one embodiment.

FIG. 1 is a diagram of a system capable of multi-device media presentation, according to one embodiment. By way of example, the system enables a multi-device presentation to be created based on a request to present a media file, the physical proximity of one or more devices, their media presentation capabilities, various connecting and positioning sensors, and one or more command signals for controlling the multi-device media presentation.

Typical mobile devices such as cell phones, Smartphones and the like are designed primarily for mobility. Consequently, they feature small visual displays that are intended primarily for enabling a single user to view information sized to the dimensions of the display. With the increase in various content sharing services, social networking, and other multimedia-rich services, the limited visual capacity of small displays inhibits the overall user experience. In addition to the limited visual capacity of such devices, there are other aspects that make multi-device media presentation desirable.

One aspect of devices featuring displays that is making the ability to create a multi-device presentation more desirable is the trend towards more efficient usage of the display area. Newer devices feature screens that extend to the physical borders of the device in order to maximize the display size while maintaining a small form factor. As a result, mobile devices feature an active display area that extends to the edges of the device. The increasing availability of this feature means that individual devices may be more seamlessly combined into a single larger display by aligning them on a flat surface such that they are adjacent to each other.

Another aspect is the desire for an enhanced audio-visual experience by combining high quality video content with multichannel audio. Audio content may be more effectively presented with a multi-device presentation if the perception of sound in space (e.g., surround sound) can be recreated. A single mobile device may only be capable of presenting audio content via a single speaker, thus inhibiting the quality of experience for listeners. Various multimedia content encoding standards support multichannel audio encoding. High quality digital video data is accompanied by multichannel audio content. It is therefore desirable to create a multi-device presentation to reproduce various spatial sound effects.

A third aspect is the typical environment in which most users ordinarily use their devices. In particular, the increasing demand for access to media services in mobile environments is problematic because most mobile environments lack the kind of multimedia equipment found, for example, in a home, educational, or business environment. Typically, the mobile environment only provides an ad-hoc networking capability. Therefore, an ability to create a multi-device media presentation in such an environment is highly desirable.

To address these aspects, the approach described herein pertains to methods and systems for creating a multi-device presentation in an ad-hoc networking environment. Presenting a media file at one or more devices enhances the user experience by presenting the media files at a presentation area larger than that of any individual device. The user quality of experience with respect to visual data is enhanced because the display area is made larger by distributing portions of each video frame among the devices. Similarly, the user quality of experience with respect to audio content is enhanced because multichannel audio content can be separately delivered over one or more speakers. Although the discussion herein may occasionally refer to mobile devices, it is contemplated that the approach described herein may apply to any type of device capable of presenting one or more types of media content.

As shown in FIG. 1, the system 100 comprises a user equipment (UE) 101a-101n (also collectively referred to as UE 101 or user devices 101) having connectivity to the multi-device presentation platform 103 over communication network 105. Each of the UE 101 may communicate with the multi-device presentation platform 103 via the communication network 105, according to one embodiment. For example, components of the UE 101 may interact with the multi-device presentation platform 103 according to a client-server model. In one embodiment, one or more components of the multi-device presentation platform 103 (discussed with respect to FIG. 2) may be integrated into the multi-device manager 107 of one or more UE 101

As shown in FIG. 1, the UE 101 may also have connectivity to one another via the ad-hoc network 109. The ad-hoc network 109 is, for instance, a connectionless and serverless device-to-device network (e.g., a mobile ad-hoc network (MANET)) created using short-range radio technology (e.g., wireless local area networks (WLAN), Bluetooth®, etc.) Within the ad-hoc network 109, each UE may be mobile and within communication range of any number of other UEs. Accordingly, the set of those UEs that are within communication range of any other UEs may change as the UE 101 move from location to location and/or in and out of communication range. Also, the UE 101 may connect to or disconnect from the ad-hoc network 109 on demand.

The UE 101 may exchange awareness information among each other via the ad-hoc network 109. As used herein, the term "awareness information" refers to any content, information and/or context about a local environment as well as the users and communication devices within the local environment. The information may be in the form of short anonymous messages broadcasted (e.g., a flooding message) from one UE (e.g., UE 101a) to neighboring UEs (e.g., UE 101b-101n) that are within the communication range of the broadcasting UE. As a neighboring UE (e.g., UE 101b) receives the broadcasted message, it may in turn rebroadcast the message to other neighboring UEs. In this way, the originally broadcasted message may propagate (e.g., hop) throughout the ad-hoc network 109. In various embodiments, the extent of the propagation may be limited by criteria such as distance, location, time, user preference, etc.

In the ad-hoc network 109, the messages may be utilized for carrying small sized awareness information messages among the UE 101. However, within the system 100, content items (e.g., sample/indicator files of compressed media containing voice, video, images, etc.) may also be broadcast via the messages among the UE 101. Further, the messages may also contain pointers to the content or a small amount of data (e.g. presence or context information) to minimize the data traffic transported over the ad-hoc network 109. The UE 101 may then access the content using other communication channels (e.g., via IP through the communication network 105).

As also shown in FIG. 1, the system 100 comprises one or more media services 111a-111m (also collectively referred to as media services 111) via the computer network 105. The media services 111 may be any hosted (or even client/server based) service that the UE 101 may access to obtain media content concurrently, in real-time, and/or interactively. The media services 111 may include various content delivery or content sharing applications (e.g., You-Tube®, Flickr®, Pandora®, Netflix®, etc.), website for broadcast headend systems (e.g., television broadcast headend systems, cable subscriber headend systems, etc.), interactive on-demand systems (e.g., pay-per-view systems), as well as any other systems capable of delivering content to the UE 101 via the communication network 105. One or more of the media services 111 may run in a hosted or cloud-based environment. Alternatively, the UE 101 may access media content locally via the ad-hoc network 105 and/or one or more local area networks (LANs) (not shown for illustrative convenience). As shown, the UE 101 may be connected to, or include, a local media storage 113, including various forms of internal (e.g., internal disk, flash, random access memory (RAM), etc.) or network storage (e.g., file servers).

Each UE may also have operable thereon one or more connectivity and positioning sensors (CPS) 115a-115n (also collectively referred to as CPS 115) for enabling respective devices to detect the location of other devices relative to its current position, orientation or movement. By way of example, the CPS 115 is a positioning system that combines ultrasonic and inertial positioning sensors to detect changes in movement, position, orientation (e.g., tilt or skew) or presence of other devices or UE 101.

In certain embodiments, the inertial positioning sensors of the CPS 115 are employed using gyroscopes, accelerometers and compass technology. Momentary positions and gestures are persistently calculated as well using the data collected by these devices. Consistent observance of relative positional change is performed for each device individually, as well as relative to each other. For example, accelerometers allow the devices to detect whether they are stationary and whether their gravity vectors are parallel. The ultrasonic positioning sensors of the CPS 115 may be employed using a microphone and speaker (not shown for illustrative convenience). These can emit and detect inaudible ultrasonic audio signals at different strength levels, which can be used to measure the distance to a neighboring device. Alternatively, the distance can be measured based on a time-of-flight (or propagation delay) of the audio signal or the propagation difference between emitted audio and radio signals. Radio signals may also be employed to provide estimations of distance based on their strength (e.g., touch-to-select Bluetooth® technology). These capabilities facilitate collaborative communication among complimentarily placed devices and enable respective devices to perform shared application or media file usage.

In one embodiment, the multi-device presentation platform 103 detects one or more neighboring devices based on a request to present a media file at a device and determines one or more media presentation capabilities of the one or more neighboring devices. By way of example, UE 101a may access media service 111a and detect the presence of one or more neighboring UE (e.g., UE 101b-101n). In one embodiment, the UE 101a controls the multi-device presentation in a master/slave configuration with the other UE 101. It is contemplated that any of the UE 101 may be the master for a portion or the entire duration of the presentation, depending on various factors, including their continued physical proximity and operating condition (e.g., remaining battery power, audio or visual presentation capabilities). It is further contemplated that control of the multi-device presentation may transfer at any subsequent time. For example, one of the other devices (e.g., UE 101n), or an entirely new device, may initiate another video clip causing control to transfer from UE 101a to the other device. In another embodiment, the UE 101 act cooperatively to exchange information and media presentation capability information and independently perform the functions of one or more components of the multi-device presentation platform 103.

Next, the multi-device presentation platform 103 forms a subgroup of the device, the one or more neighboring devices, or a combination thereof based on their media presentation capabilities, and determines a layout comprising the subgroup for a multi-device presentation of the media file. By way of example, the subgroup may comprise UE 101a and one or more other of the UE 101 (e.g., UE 101b-101n) arranged adjacent to each other on a flat surface in a 1-by-3 (one row of three UE) configuration. For purposes of illustration, reference will be made to a coplanar, rectilinear, or otherwise contiguous arrangement of the UE 101 for a video presentation. However, it is contemplated that the approach described herein is adaptable to a variety of other non-contiguous arrangements. For example, the UE 101 may be arranged according to various other two or three dimensional configurations (e.g., multiple displays forming a cube or other shape) depending on the nature of the content to be presented. For example, multichannel audio content may be presented according to a non-contiguous arrangement of the UEs 101 in three dimensions to achieve various spatial sound effects (e.g., rear, front, and side channels).

As used herein, "layout" refers to the spatial positioning, orientation or ordering of the UE 101. As described below, the spatial positioning may be determined by means of the camera, ultrasonic and inertial positioning systems of the CPS 115. An "ordering" may refer to a sequential or logical ordering (e.g., first, second, third, etc.) of the UE 101. The ordering may indicate the order (second, third, etc.) in which the neighboring devices are placed with respect to the master device (the first device). The orientation may refer to the direction in which a UE 101 is pointing as it lies on flat surface and/or indicate the degree of misalignment with respect to any adjacent UE 101.

In one embodiment, the multi-device presentation platform 103 may form the subgroup based on a physical proximity, a state of movement, a physical orientation, a radio proximity, an audio-based proximity, or a combination thereof among the at least one device, the one or more neighboring devices, or a combination thereof. By way of example, a subgroup may comprise those of the UE 101 that are lying within a certain threshold distance with respect to the master device and have a specific orientation.

In one embodiment, the multi-device presentation platform 103 may cause an activation of one or more camera sensors, one or more light sensors, or one or more proximity sensors to collect sensor information related to an object moving over the subgroup. It may then process the sensor information to determine an alignment of the at least one subgroup with respect to the layout. For example, the CPS 115 may also include camera positioning sensors which may be employed using a front-facing camera (not shown for illustrative convenience). By using various image matching and stitching technologies, images captured by the front-facing cameras can be used to determine the relative position and orientation one or more UE 101 facing in the same direction. By way of example, image segments of a ceiling captured from one or more adjacent UE 101 may be arranged based on image aligning features of the ceiling (e.g., artificial lighting fixtures, vents, decorative designs, etc.). In addition to their use as positioning and orientation sensors, the front facing cameras may also be used to determine an ordering of the devices by capturing images of an object moving over the devices in the direction of the ordering (further described with respect to the layout module 207 in FIG. 2).

In one embodiment, the multi-device presentation platform 103 may further cause a transmission of a common time-stamp among the members of the sub-group. Next, it may cause a synchronization of the multi-device presentation of the one or more media files based on the common time-stamp, wherein the transmission of the common time-stamp is performed via an exchange of audio signals, an exchange of radio signals, or an alignment of one or more views of the camera sensors. As used herein, a "common timestamp" may refer to any information exchanged among the devices to indicate a particular time to begin the presentation. By way of example, UE 101a may exchange and agree on a common timestamp with each of the other UE 101 in the subgroup in order to synchronize the multi-device media presentation.

In one embodiment, the multi-device presentation platform 103 may cause a distribution of the one or more media files among the members of the subgroup via centralized means or distributed means. As mentioned previously, media content may be accessed locally at an internal storage, local network storage, or remotely at one or more media services 111. For example, UE 101a (the master device) may access its internal memory (not shown for illustrative convenience) or access it at a media service 111 (e.g., YouTube®, etc.) to download it. In one embodiment, each of the members of the subgroup may independently access and download the media content based on pointer information received from the master device and/or the multi-device presentation platform 103.

In one embodiment, the multi-device presentation platform 103 may determine the respective portions of the media file to distribute to the devices of the subgroup based on the layout or their media presentation capabilities. As mentioned, the layout will indicate the positions, orientation and ordering of the subgroup devices of which one is the master device. The layout will also include information regarding the display size, resolution, audio channels, etc. In one embodiment, the multi-device presentation platform 103 utilizes this information to determine the portion of the media content (video and/or audio content) that each device will present to create the multi-device presentation.

In one embodiment, the multi-device presentation platform 103 causes a transmission of control signals among the subgroup for controlling the multi-device presentation of the media file, wherein the transmission is performed via one or more short-range wireless means. In one embodiment, the master device (e.g., UE 101a) may control the multi-device presentation by stopping, starting, restarting, and/or terminating the presentation. Various other possible control signals may be caused to be exchanged among the devices to begin an entirely new presentation with the same layout, modify the layout for a current presentation, etc. It is contemplated that the devices may seamlessly transfer control among each other depending on various factors, including operational capacity (e.g., battery capacity, processing power, incoming phone call, etc.), continuing proximity and subgroup membership, or express requests by one or more users to take control of the presentation.

In one embodiment, the multi-device presentation platform 103 may cause a detection of one or more changes to the subgroup, the neighboring devices, or their media presentation capabilities. In one embodiment, this may cause an update to the subgroup or the layout based on the changes. By way of example, the subgroup may be changed based on the non-availability of the master device or one or more of the other devices. Further, a new device may be added to the subgroup. Such changes may trigger the multi-device presentation platform 103 to update the layout and restart the presentation. As mentioned, control may also be caused to transfer from the original master device to one of the other devices in the subgroup if, for example, the master device is no longer able to continue participating in the multi-device media presentation.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

By way of example, the UE 101, the multi-device presentation platform 103 and the media services 111 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
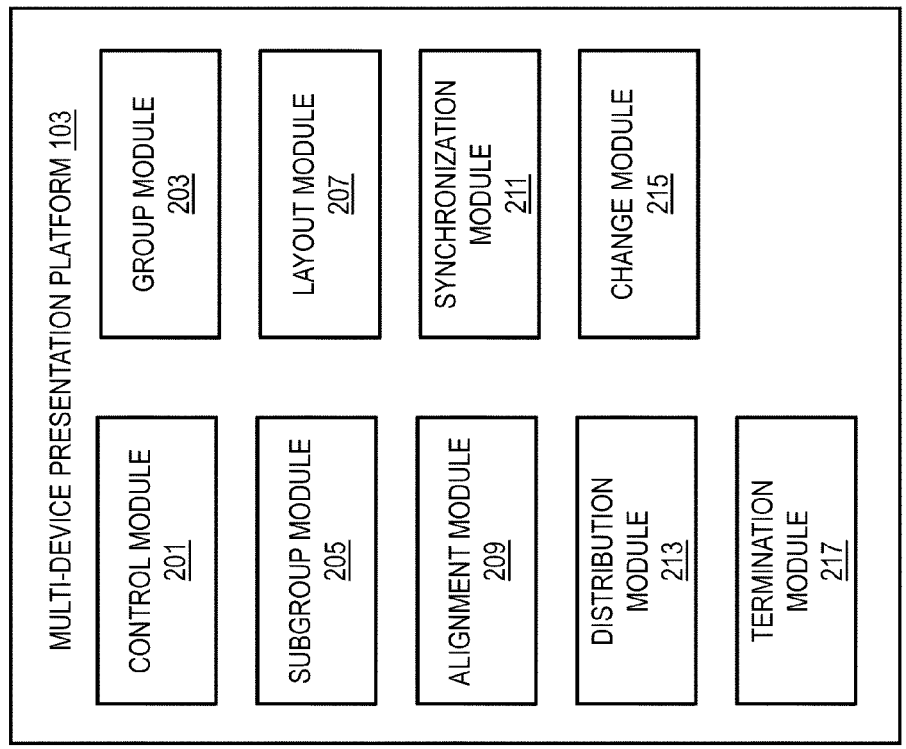
FIG. 2 is a diagram of the components of a multi-device media presentation platform, according to one embodiment.

FIG. 2 is a diagram of the components of a multi-device presentation platform 103, according to one embodiment. By way of example, the multi-device presentation platform 103 includes one or more components for creating a multi-device presentation based on one or more of the UE 101. It is contemplated that the functions of these components may be combined in one or more components or performed by other components of equivalent functionality. In this embodiment, the multi-device presentation platform 103 includes a control module 201, a group module 203, a subgroup module 205, a layout module 207, an alignment module 209, a synchronization module 211, a distribution module 213, a change module 215, and a termination module 217. One or more of the modules may be integrated into the multi-device manager 107 of one or more of the UE 101. In one embodiment, a master UE (e.g., UE 101a) may be used to create a multi-device presentation comprising one or more other UE (e.g., UE 101b-101n).

In one embodiment, control module 201 uses group module 203 to form a group of one or more neighboring devices that may be able to participate in a multi-device media presentation. The ability to participate may be gauged based on various relevant features (e.g., display size, resolution, audio processing capacity, battery capacity, etc.) of the neighboring devices. In one embodiment, group module 203 may form the group based on the awareness information messages exchanged among the UE 101 via the ad-hoc network 109. Based on this information, the group module 203 may determine a group of devices that may be used to create a multi-device presentation for a particular media file. For example, the group module 203 may determine whether the presentation capabilities of a neighboring device are compatible with the format of the media file (e.g., .mpg, .wmv, .rm, etc.), its resolution, aspect ratio, and other media encoding and media representative features.

In one embodiment, control module 201 uses subgroup module 205 to cause a formation of a subgroup of one or more devices from the group of neighboring devices. In one embodiment, the subgroup comprises one or more neighboring devices positioned within a maximum separation distance from the master device. As previously mentioned, the subgroup module 205 may determine the respective distances among the neighboring devices based on positioning sensor information collected and exchanged among the devices in the group. For example, the subgroup module 205 may compare the distance based on the positioning data obtained by the CPS 115. In one embodiment, the subgroup module 205 may be implemented in the multi-device manager 107 of a master device. The master device (e.g., UE 101a) may calculate the distance to the other UE 101 (e.g., UE 101b-101n) and share the results. Alternatively, each of the member devices of the subgroup may estimate its distance to the other UE 101 and share its results with all the other UE 101. In one embodiment, the subgroup module 205 may rely on an external service to obtain positioning information of the group of neighboring devices. By way of example, an indoor positioning service (e.g., high accuracy indoor positioning service (HAIP)) may assist subgroup formation by detecting whether the devices of the subgroup are potentially within a feasible range from each other.

In one embodiment, control module 201 may use layout module 207 to define a layout of the one or more UE 101. As previously mentioned, the layout of a subgroup may indicate the position, orientation, and/or ordering of one or more devices in the subgroup. The layout module 207 may interact with the subgroup module 205 to obtain the number of devices and may also interact with one or more components of the UE 101 to obtain their respective positioning information as determined by CPS 115.

In one embodiment, the layout module 207 may infer a rough initial layout based on the number of the UE 101 in the subgroup. By way of example, if there are four devices in the subgroup, the layout module 207 may infer that the layout is a 1-by-4 configuration (all four devices are in a single row) or a 2-by-2 configuration (2 devices per row and two columns). Based on this determination, the user may be prompted to confirm which of the two configurations is correct. If there are three devices in the subgroup, the layout module 207 may infer that the only possible layout is a 1-by-3 configuration (three devices in a single row). It is contemplated that layout module 207 may similarly infer the possible layouts for a pure audio multi-device presentation based on the number of audio channels. For example, if there are four UEs 101 and four channels, the layout module 207 may infer that the UEs 101 may be arranged to occupy front, rear, left and right positions with respect to a center. In case of any ambiguity, the layout module 207 may cause to request a user to select and confirm the correct layout.

In one embodiment, the layout module 207 may be caused to determine a layout based on various positioning sensor information obtained from the subgroup. The layout module 207 may be caused to use distance information obtained by ultrasonic audio and/or radio signals to determine the relative distances between the devices. By way of example, the position of the microphone and the speaker of each of the UE 101 may be used to determine both an order and an orientation of each of the devices. The order may be determined based on detecting the relative strength, time-of-flight, or propagation delay of audio signals and the orientation may be determined based on information specifying the position of either the speaker or the microphone (e.g., the speaker is located towards a top part of the device and the microphone is located towards a bottom part).

In one embodiment, the layout module 207 may be caused to utilize camera-based positioning information to determine the layout. In one embodiment, the layout module 207 may receive the camera sensor information from one or more of the subgroup devices and process the information to determine the layout. For example, each of the UE 101 in FIG. 1 may have a front-facing camera. These cameras may be activated in order to capture one or more images of an object (e.g., a user's hand) moving over the cameras. In one embodiment, the layout module 207 processes the captured images of the moving object from each of the UE 101 to determine their order with respect to the direction of motion. For example, an image of the object from each of the UE 101 may be associated with its own time of capture. Layout module 207 may process the time of capture from each of the images to determine the order of the UE 101 with respect to the movement of the object. It is contemplated that a similar approach may be used to define a layout for a presentation comprising multiple projectors (e.g., a tiled wall display) or an imaging system comprising multiple cameras.

In one embodiment, the layout module 207 may also determine whether the devices are misaligned based on the captured images. As previously mentioned, various image matching and image stitching technologies may be employed to compare captured images from adjacent devices to determine detailed positioning and orientation information. In one embodiment, a non-participating UE may be used to create a multi-device presentation comprising one or more other UE. By way of example, the non-participating UE may be used to create a presentation from one or more electronic paper (e-paper) displays randomly arranged on a surface or wall. A user may capture an image of the e-paper displays from above them with the non-participating UE, which may then define the layout.

It is contemplated that the layout module 207 may cause one or more of the devices in the subgroup to request user input specifying the layout. By way of example, the user may arrange according to a specific layout and then be prompted to enter one or more pieces of information indicating the number and positions of each of the devices with respect to each other. It is further contemplated that the multi-device manager 107 may provide assistance to the user in the form of alignment signals and/or graphical indicators of position.

In one embodiment, the control module may use the alignment module 209 to process to further refine the layout as defined by the layout module 207. Such refinements may be based, for example, on detected misalignment in the subgroup. By way of example, the UE 101 may not be parallel to each other or may partially overlap (e.g., if the UE 101 are very thin). The alignment module 209 may adjust the layout by recalculating or otherwise adjusting the layout to correct for such irregularities. In addition, the alignment module 209 may also adjust the layout to exclude those portions corresponding to non-display areas of a device (as described with respect to FIG. 4F). For example, one or more of the UE 101 may have a border element. The alignment module 209 may utilize the device information to remove from the layout portions corresponding to the non-display areas. It is contemplated that the alignment module 209 may continually take into account momentary positioning and orientation information to adaptively adjust the layout in response to changes in the positioning information received from the UE 101. It is also contemplated that a similar approach may be used to align a presentation comprising multiple projectors (e.g., a tiled wall display) or an imaging system comprising multiple cameras In one embodiment, control module 201 uses synchronization module 211 to cause a synchronization of the multi-device presentation of a media file based on a common time-stamp. As previously mentioned, a common timestamp may be determined by the UE 101 based on exchanging various audio and/or radio-based synchronization signals. One of the UE 101 may transmit the signal and the other UE 101 may synchronize to the signal. The synchronization module 211 may also provide synchronization based on the timestamps associated with images captured by front-facing cameras of the respective devices. In one embodiment, the UE 101 may individually transmit the timestamp information to the synchronization module 211 so that it may then determine the common timestamp. In one embodiment, synchronization may be assisted by a visual inspection of the devices by a non-participating UE. By way of example, the non-participating UE may use its camera to view the presentation to determine if the presentation is synchronized. If it is not synchronized, the UE may give instructions to correct the lack of synchronization. The non-participating UE may also be used to adjust the quality of the presentation by fine-tuning settings (e.g., color saturation, hue, etc.).

In one embodiment, the control module 201 uses the distribution module 213 to cause a distribution of a media file among the one or more devices of the subgroup. As previously mentioned, media content may be stored locally (in an internal or a local network storage) or remotely (e.g., at a remote media service). Further, each device may cause to be distributed the entire contents of the media file or only the portions of the content presented by the device. In one embodiment, the distribution module 213 causes the entire media file to be distributed to each of the devices of the subgroup. The media file may be distributed to the devices by the master device or it may be obtained by each of the devices independently (e.g., from a local or remote storage). By way of example, the master device may transmit a copy of the media content to each of the slave devices. Alternatively, the master device may indicate to each of the slave devices the source of the content by means of metadata (e.g., URL, directory path) and request each of the slave devices to obtain content directly from the source. In another embodiment, the distribution module 213 causes the distribution to each of the devices of only a portion of the media file. The master device may transmit a copy of the portion to each of the slave devices. Alternatively, the master device may indicate the source of the content and each of the slave devices may directly obtain the assigned portion. In an embodiment where one non-participating UE is used to determine the layout, the non-participating UE may be further used to define and distribute the content (either in its entirety or its portions) to the devices of the subgroup. By way of example, a device may be used to distribute content for a multi-device presentation comprising e-paper displays even though the device is not part of the presentation.

It is contemplated that the distribution module 213 may take into consideration various factors in determining whether to distribute the entire media file or only portions of it. These considerations may include, for example, the power consumption, available bandwidth and service-level agreements of the devices in the subgroup. An additional consideration may be whether the apportionment of the media file requires significant processing. For example, compressed or encrypted media files may require significant effort to decompress or decrypt. In such cases, the distribution module 213 may determine it more expedient to broadcast the original compressed media file to all the devices and require the slave devices to determine substreams of the media file after local decompression or decryption.

In one embodiment, the control module 201 uses the change module 215 to detect one or more changes to the subgroup, the neighboring devices and/or their media presentation capabilities. These changes may include one or more new devices being added to the subgroup, one or more devices being removed from the subgroup, or changes to the layout. Changes to the layout may be triggered by movement of one or more of the devices, technical failures of one or more components of the devices, and changes in the proximity of the devices to each other. In one embodiment, the change module 215 is caused to detect the change based on the connection and positioning sensors of the devices. In one embodiment, the change module 215 may detect a change in the layout based on the signal strength of the direct device-to-device communication links. In response, the change module 215 may cause one or more of the group module 203, subgroup module 205, layout module 207, alignment module 209 synchronization module 211, and synchronization module 213 to modify the respective group, subgroup, layout, alignment, and synchronization of the multi-device presentation.

In one embodiment, the control module 201 uses the termination module 217 to end a multi-device presentation. The termination module 217 may cause to detect one or more events signifying the end of a presentation. By way of example, these events may include the end of the presentation of its own accord, unavailability of one or more of the devices in the subgroup and any technical failure (e.g., loss of signal) that may irreparably disrupt the presentation. In a presentation controlled by a master device, the unavailability of the master device may also signify the end of the presentation. In one embodiment, termination may be triggered by the detection of a moving object (e.g., a moving hand) as observed by a device camera. By way of example, a first hand wave may be used to define the layout and synchronize the presentation and a second (or subsequent) hand wave may be used to terminate the presentation. In response to detecting such events, the termination module 217 may cause to stop further attempts to access the media file, stopping the presentation on the devices in the subgroup, and informing the master device that the presentation is to be ended. In one embodiment, the termination module 217 may cause any available devices to display a static or moving icon based on pre-loaded content stored locally at the devices.

Figure 6:
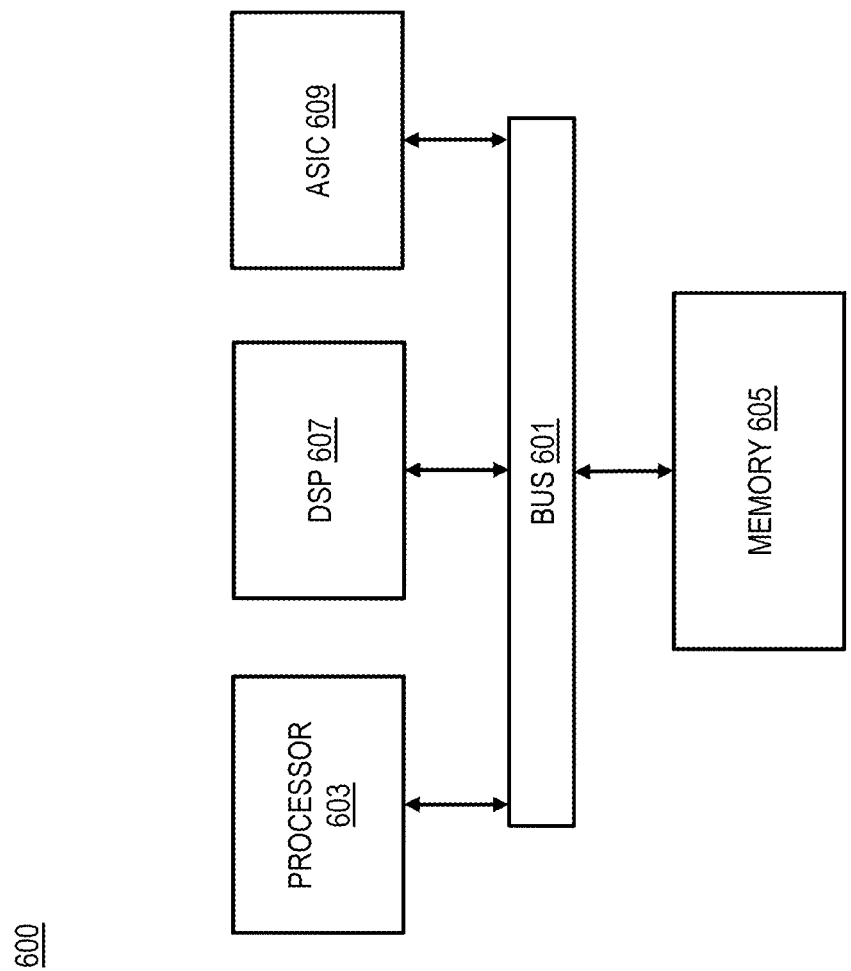
FIG. 6 is a diagram of a chip set that can be used to implement an embodiment of the invention.

FIGS. 3A-3F are flowcharts depicting processes for enabling a group of devices to create a multi-device media presentation, according to one embodiment. In one embodiment, the multi-device manager 107 depicted in FIG. 1 performs the one or more processes and is implemented in, for instance, a chip set including a processor and a memory as shown in FIG. 6. In addition, or alternatively, all or a portion of the processes may be performed by the multi-device presentation platform 103. For purposes of illustration, reference will be made to an exemplary use case of a user who has accessed the media service 111a and downloaded a video clip to his or her device (e.g., UE 101a) at the time the processes depicted in FIGS. 3A-3F are initiated. The user wishes to view the video clip as a multi-device presentation and lays the device ("master device") alongside one or more other devices ("slave devices") on a flat surface.

Figure 3B:
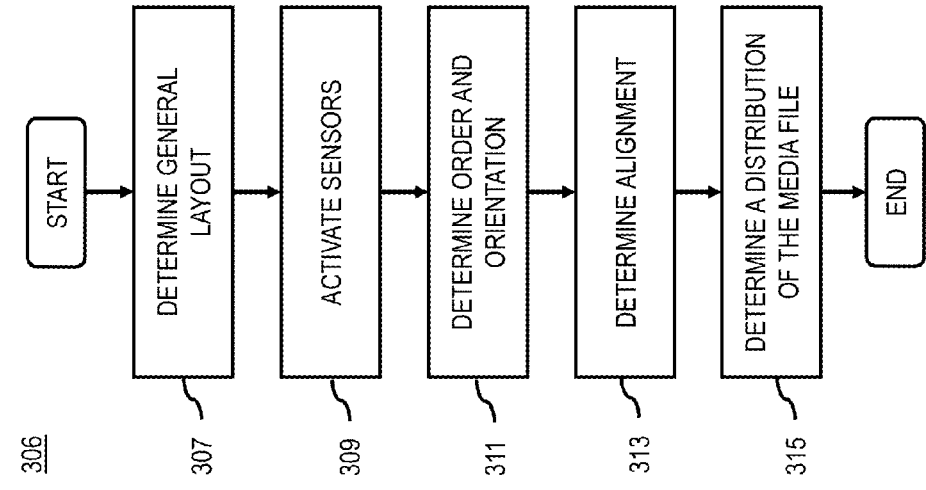
Figure 3A:
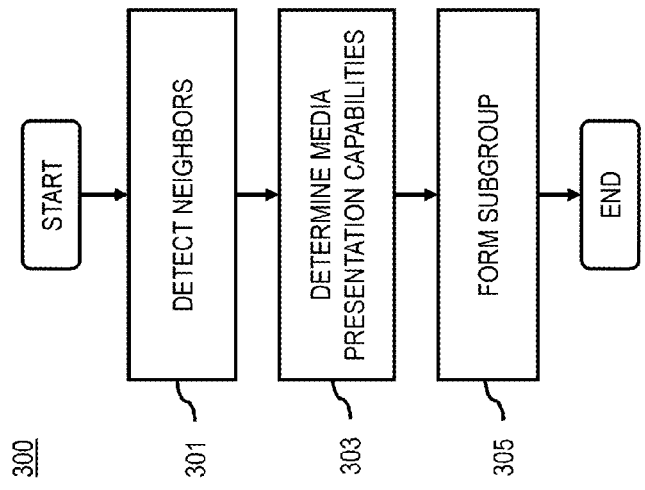

FIG. 3A is a flowchart of a process 300 for forming a subgroup of the device, the one or more neighboring devices, or a combination thereof based on their media presentation capabilities, according to one embodiment. Per step 301, the master device (e.g., UE 101a) detects one or more neighboring devices by listening for broadcasts from devices connected to the ad-hoc network 109. Per step 303, the multi-device presentation platform 103 causes the master device to request the neighboring devices for their respective media presentation capabilities (e.g., display size, resolution, multichannel audio, etc.) and determines their proximity (based on positioning and/or signal-based distance measurements). In step 305, the multi-device presentation platform 103 causes the master device to form a subgroup comprising neighboring devices that are within a maximum threshold distance and also possess the presentation capabilities (e.g., display size, resolution) to present the video clip.

FIG. 3B is a flowchart of a process 306 for defining a layout comprising the subgroup formed by process 300, according to an embodiment. In step 307, the multi-device presentation platform 103 determines the general layout of the subgroup based on the number of devices in the subgroup. Continuing with our example, given that there are three devices in the subgroup including the master device, the multi-device presentation platform correctly infers that the layout is 3-by-1 (three devices arranged in a single row). Per step 309, the multi-device presentation platform 103 causes the devices of the subgroup to activate one or more positioning sensors, including camera, light, and/or proximity sensors. As previously mentioned, the camera sensor may include a front-facing camera of the device and the proximity sensors may include audio or radio signal-based sensors. Per step 311, the multi-device presentation platform 103 determines an order and an orientation of the devices in the subgroup based on the sensor information. Alternatively, the master device may present to the user various possible layouts and request the user to select the correct layout. Next, in step 313, the multi-device presentation platform 103 causes to determine an alignment of the devices in the subgroup. As previously mentioned, the alignment may include fine adjustment of the layout based on differences in orientation of the devices. Or, it may include a fine adjustment based on overlapping portions of the layout as determined in step 311. Continuing with our example, the platform may determine that the video clip cannot be divided into three equal sized portions to fit the respective sizes of the three devices without creating overlapping sections. This may occur if, for example, the layout does not correspond to the aspect ratio (e.g., 16:9) of the video clip. Per step 315, the multi-device presentation platform 103 determines the respective portions of the media files to distribute to the devices in the subgroup.

Figure 3D:
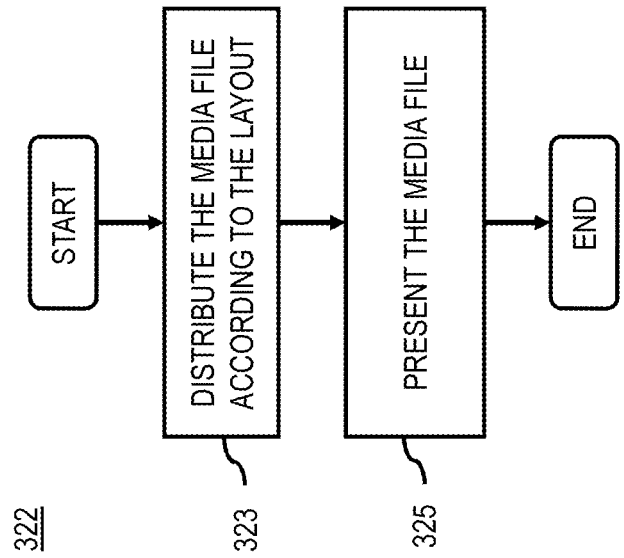
Figure 3C:
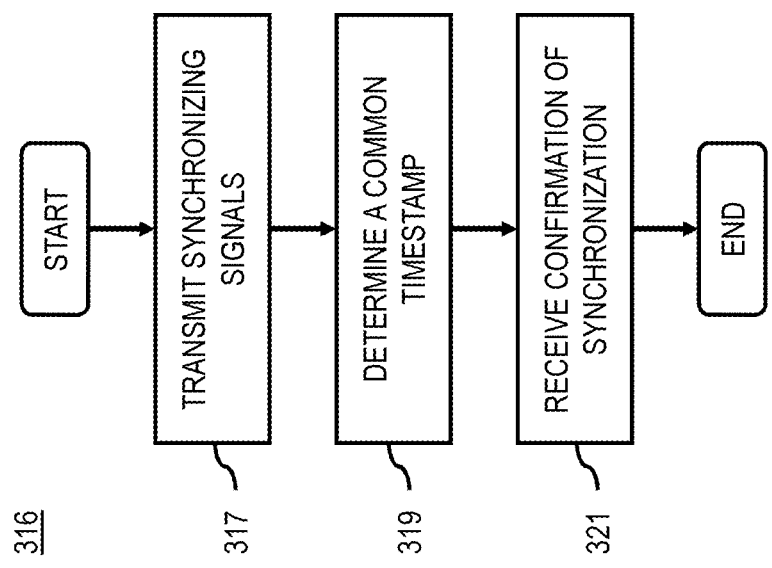

FIG. 3C is a flowchart of a process 316 for causing a synchronization of the multi-device presentation, according to an embodiment. In step 317, the one or more devices of the subgroup transmit synchronizing signals, including one or more audio signals, radio signals, or views of the camera sensors. In one embodiment, the slave devices synchronize to a synchronization signal from the master device. In step 319, the multi-device presentation platform 103 determines a common timestamp based on the synchronizing signals. In one embodiment, the presentation platform 103 causes the master device to share the common timestamp with the slave devices. In step 321, the master device receives confirmation of synchronization from the one or more slave devices.

FIG. 3D is a flowchart of a process 322 for causing a distribution of the media file among the one or more devices of the subgroup, according to an embodiment. In one embodiment, the distribution of the media file may begin before the devices of the subgroup are synchronized. If so, the one or more devices of the subgroup may buffer the media file till the process 316 finishes executing. In step 323, the multi-device presentation platform 103 is caused to distribute the media file according to the layout. In step 325, the multi-device manager causes the devices to synchronously present their respective portions of the media file.

FIG. 3E is a flowchart of a process 326 for updating the multi-device presentation based on detecting changes to the subgroup, the one or more neighboring devices, or the one or more media presentation capabilities, according to an embodiment. In step 327, the multi-device presentation platform 103 detects one or more changes to the multi-device presentation. As mentioned previously, these changes may include one or more new devices being added to the subgroup, one or more devices being removed from the subgroup, or changes to the layout. Continuing with our example, a fourth device may be added to the subgroup by placing another device as the fourth device in the row of first to third devices. Based on sensor information, the master device detects the new device. In step 329, the multi-device presentation platform 103 causes an update to the layout definition so that it reflects the addition of the new device. In step 331, the multi-device presentation platform 103 restarts the presentation based on the updated layout.

FIG. 3F is a flowchart of a process 332 for the ending of a multi-device presentation, according to an embodiment. In step 333, the multi-device presentation platform 103 detects one or more events terminating a multi-device presentation. Continuing with our example, the video clip may have come to an end. A multi-device presentation may also end if one or more of the devices of the subgroup are no longer available. By way of example, the video clip may also come to an end if one or more of the devices fail (e.g., runs low on battery power, malfunctions, etc.), receive an incoming phone call, are moved to outside of the threshold distance for the subgroup, as well as any event that causes failure because the event exceeds the error handling capabilities of a particular implementation of an embodiment. In step 335, the multi-device presentation platform 103 causes the devices to process the end of the presentation. This may include stopping access to the media file, stopping the presentation on the devices in the subgroup, and informing the master device that the presentation is to be ended.

FIGS. 4A-4G are diagrams of user interfaces utilized in the processes of FIGS. 3A-3F, according to various embodiments. For the purpose of illustration, the diagrams are described with respect to an exemplary use case of a group of device users that wish to view a video of an ice hockey match as a multi-device presentation. Under this scenario, each of the participating devices is implemented with at least a multi-device manager 107 for enabling a multi-device presentation. In one embodiment, the devices interact with the multi-device presentation platform 103 and the media services 111 in FIG. 1 to produce the presentation.

Figure 4A:
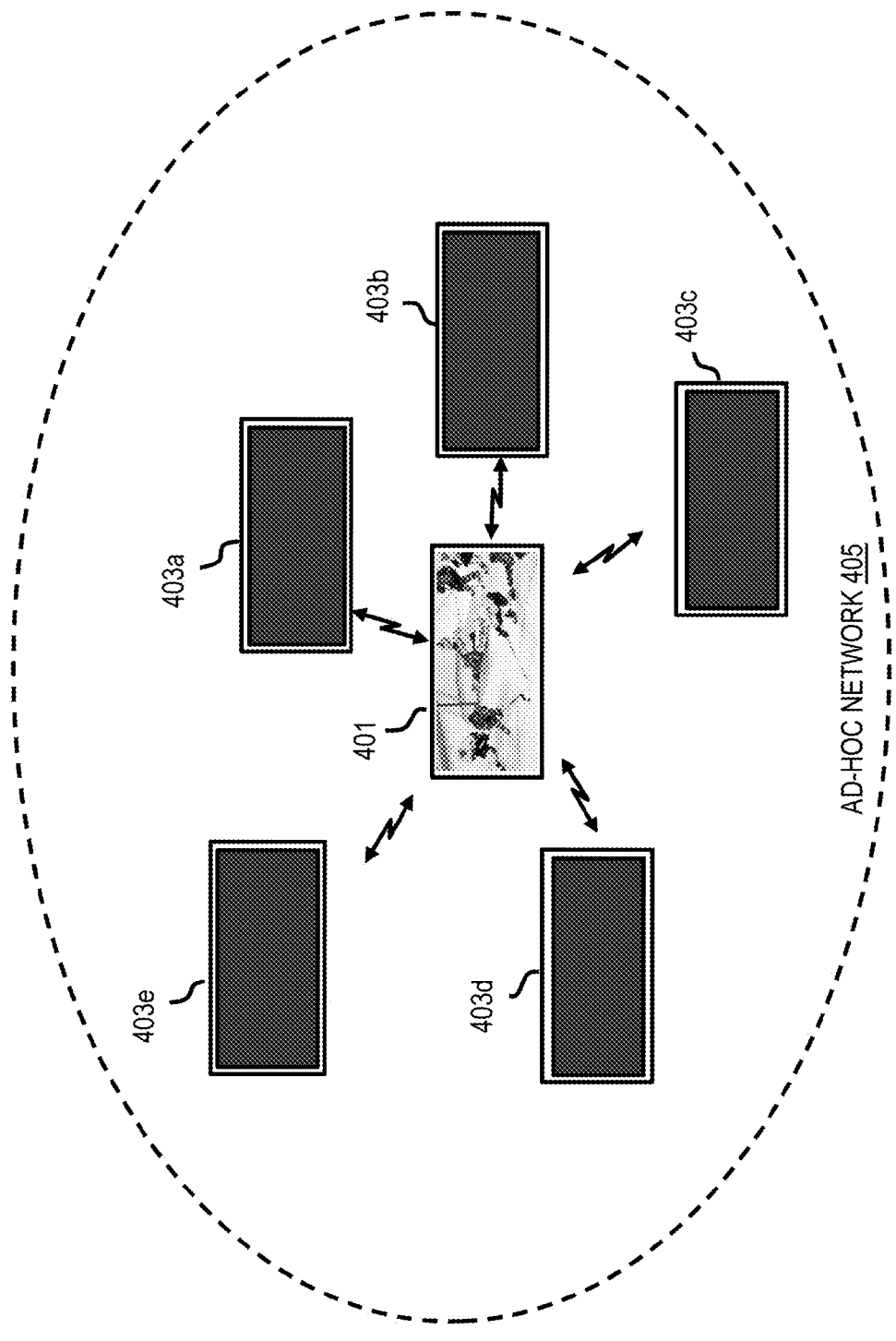
FIGS. 4A-4G are diagrams of user interfaces utilized in the processes of FIGS. 3A-3F, according to various embodiments.

FIG. 4A depicts a logical view of device 401 and the neighboring devices 403a-403e (referred to collectively as neighboring devices 403). As shown, the master device 401 is displaying a video of a hockey match in landscape mode while the neighboring devices are not presenting any content. The device 401 detects the presence of the neighboring devices 403 via an ad-hoc network 405 and communicates with them via short broadcast messages. The ad-hoc network 405 provides short range radio connectivity over which the devices communicate in connectionless fashion to learn of the presence of other devices. In one embodiment, the multi-device manager 107 of each of the devices may interact with the connectivity and positioning sensors 115 of the other devices to determine their position. As shown, the neighboring devices 403a and 403b are closer to device 401 than devices 403c-403e. The device 401 may compare the respective distances to each of its neighboring devices based on a maximum threshold distance value and determine that the user intends to create a multi-device presentation with the two devices that lie within the threshold distance.

Figure 4B:
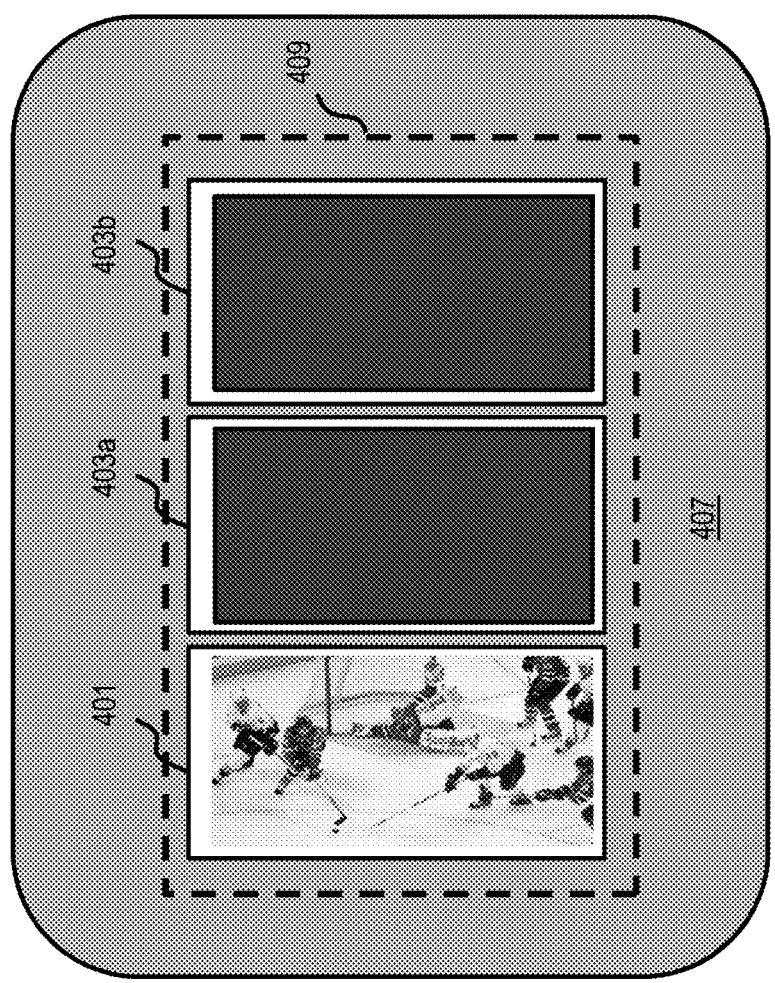

FIG. 4B depicts the physical arrangement of the device 401 and the devices 403a and 403b. As indicated, the subgroup comprising devices 401, 403a, and 403b are placed along a surface 407 (e.g., on a table) in close proximity to one another. As mentioned, the multi-device manager 107 of each device may interact with the connectivity and positioning sensors of the other devices such as to determine their position and orientation information. Based on the positioning information, the three devices 401, 403a, and 403b form a subgroup 409 according to process 300. In one embodiment, the device 401 interacts with the devices 403a and 403b in a master/slave configuration. As previously mentioned, in such a configuration the master device 401 may centrally coordinate various steps in the processes shown in FIGS. 3A-3F.

Figure 4C:
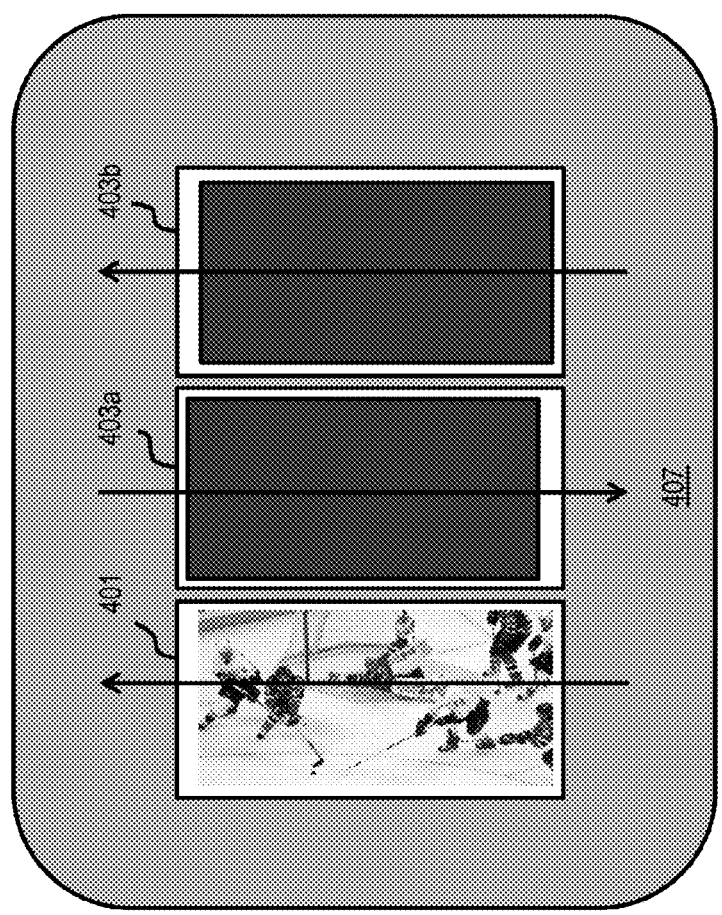

FIG. 4C depicts a scenario where one of the devices of the subgroup is oriented in a different direction than the other devices. Continuing with our exemplary use case, the device 403a is oriented 180 degrees in the opposite direction to either of the devices 401 and 403b. In one embodiment, the master device 401 defines the layout of the subgroup based, at least in part, on the orientation of the devices. The master device 401 may determine the orientation of the device 403a based on positioning sensor information (e.g., from a compass) or by audio-based signals combined with the location of the speaker and microphone of the devices. By taking the orientation of the device 403a into account, the situation of the one device presenting the video clip in an opposite orientation is prevented.

Figure 4D:
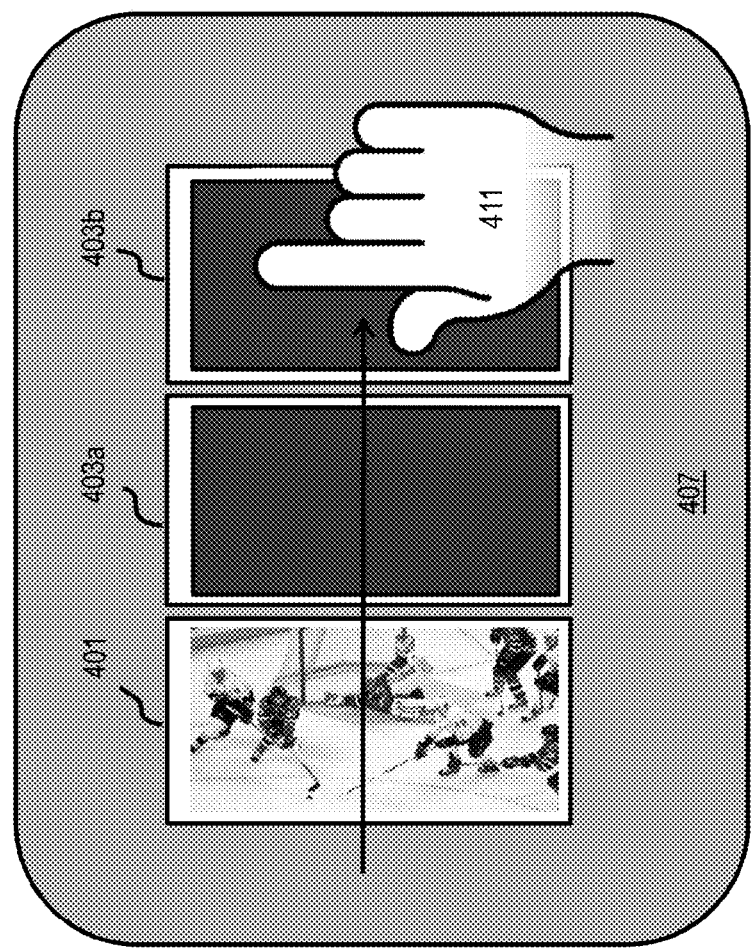

Next, the multi-device manager 107 of the master device 401 may determine an ordering of the devices to further define the layout. In FIG. 4D, the user may indicate to the devices an ordering based on a movement or gesture 411 over the devices in the direction of an ordering. As shown, the user may motion from left to right to indicate that the device 401 is a first device and the devices 403a and 403b are respectively second and third devices. As previously mentioned, a front-facing camera (not shown for illustrative convenience) of each of the devices may capture images of the hand and determine the relative ordering based on timestamp information associated with a series of images capturing the motioning object. The user may also make other motions (e.g., up and down or back and forth) to detect the ordering. In one embodiment, the master device 401 may determine the layout based on accurate timing information and a calculated velocity vector for the hand (or other object). In one embodiment, the devices 403a and 403b may individually determine a layout based on pattern recognition of the hand (e.g., based on a previously captured image of the hand) and an expected timing (e.g., based on a velocity vector), thus avoiding the need to send the image sequences to the master device 401.

Figure 4E:
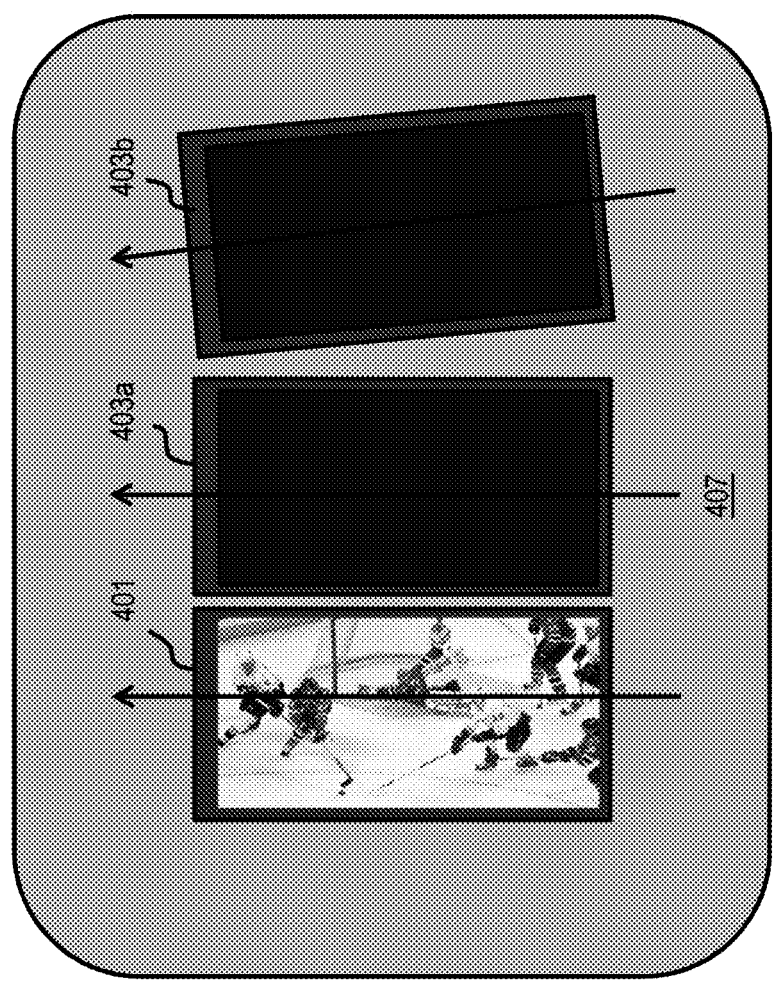

Having determined a general layout of the subgroup, an alignment of the subgroup may next be determined. FIG. 4E depicts a use case scenario where the device 403b is not perfectly parallel to the devices 401 and 403a as a result of a slight difference in orientation. In one embodiment, the master device 401 may process the orientation information of device 403b to correct for the misalignment. For example, the layout with respect to the device 403b may be modified to vary the orientation of the displayed content (when it is later presented) so that its orientation matches the orientation of the displayed content in the devices 401 and 403a.

Figure 4F:
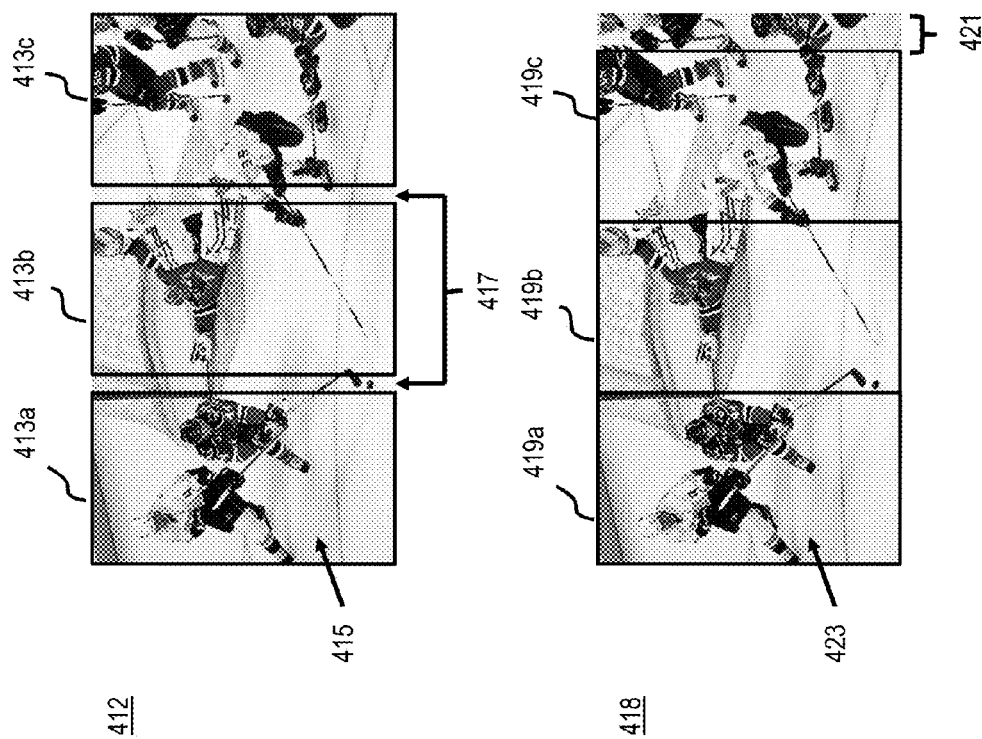

Next, the master device 401 shares the defined layout with the devices 403a and 403b. The shared information indicates the portion of the content mapped to each of the devices for a multi-device presentation. In one embodiment, each of the devices may calculate its own portion and share it with the other devices. FIG. 4F depicts a use case scenario where the layout is mapped onto the video clip in one of two ways to take into account the non-display frame areas of each of the devices. According to a first mapping 412, the layout portions 413a-413c are mapped to the video frame 415 such that they leave out intervening portions 417 comprising the non-display areas of each of the devices. Alternatively, according to a second mapping 418, the layout portions 419a-419c may be mapped to be contiguous with each other and to leave out an edge portion 421 of the video frame 423.

Figure 4G:
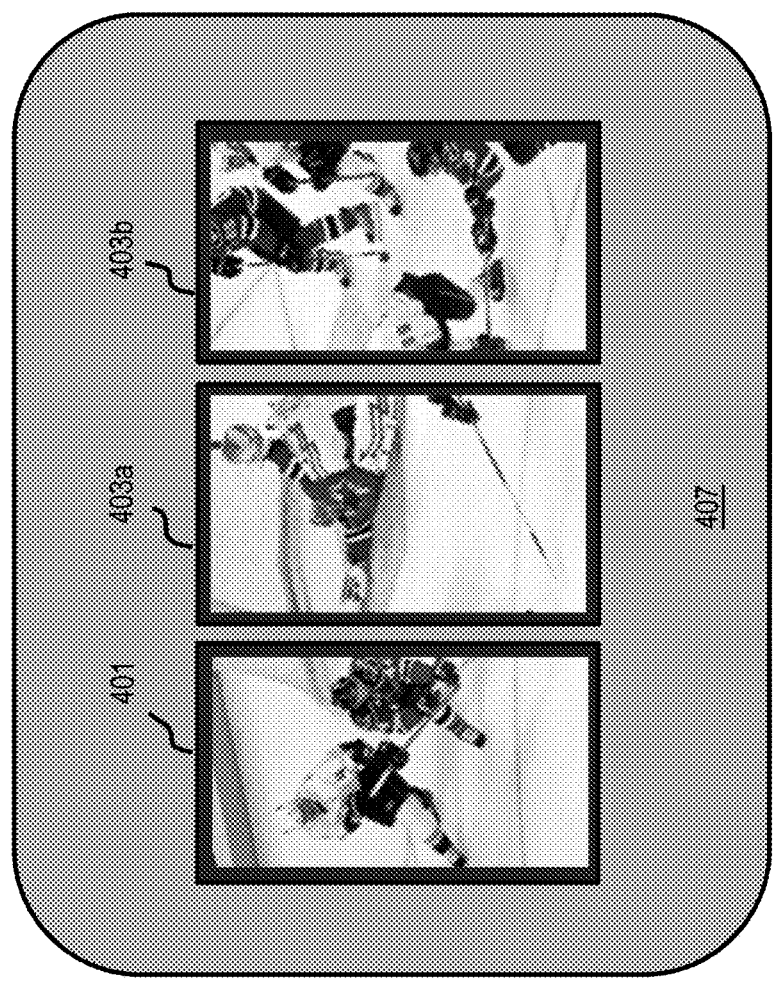

FIG. 4G depicts a multi-device presentation of the video following synchronization and distribution of the content to each of the devices in the subgroup. As shown, the video is mapped to take into account the non-display areas according to the first mapping 412 in FIG. 4F. For example, portions of the video are omitted which would lie between the display areas of adjacent devices. In one embodiment, control may pass from the master device 401 to one of the slave devices 403a or 403b if there is a change in the configuration or if the presentation ends. As previously mentioned, a configuration change may include an addition or deletion of a device, or a change in the layout. The presentation may terminate if the video ends, one or more of the devices is no longer capable of participating in the presentation, or the master device 401 is removed. If a change is detected by the multi-device manager 107 of any of the devices, the presentation may be restarted according to the processes in FIGS. 3A-3F. For example, if the third device 403b is removed, the multi-device manager 107 of the master device 401 may restart the presentation based on a new layout comprising only the display areas of the devices 401 and 403a.

The processes described herein for multi-device media presentation may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 5:
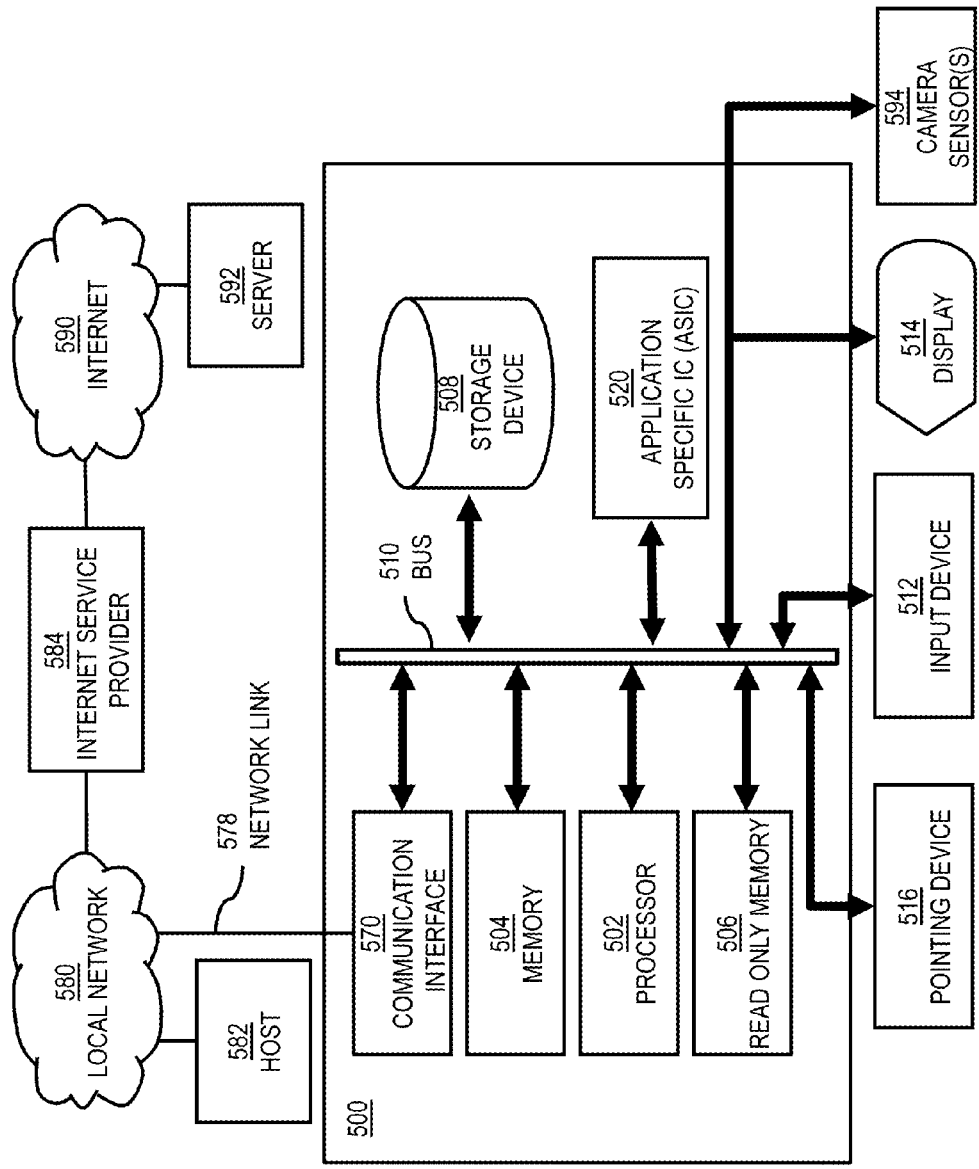
FIG. 5 is a diagram of hardware that can be used to implement an embodiment of the invention.

FIG. 5 illustrates a computer system 500 upon which an embodiment of the invention may be implemented. Although computer system 500 is depicted with respect to a particular device or equipment, it is contemplated that other devices or equipment (e.g., network elements, servers, etc.) within FIG. 5 can deploy the illustrated hardware and components of system 500. Computer system 500 is programmed (e.g., via computer program code or instructions) to create a multi-device media presentation as described herein and includes a communication mechanism such as a bus 510 for passing information between other internal and external components of the computer system 500. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions.

For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 500, or a portion thereof, constitutes a means for performing one or more steps of creating a multi-device media presentation.

A bus 510 includes one or more parallel conductors of information so that information is transferred quickly among devices coupled to the bus 510. One or more processors 502 for processing information are coupled with the bus 510.

A processor (or multiple processors) 502 performs a set of operations on information as specified by computer program code related to a multi-device media presentation. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 510 and placing information on the bus 510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 502, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 500 also includes a memory 504 coupled to bus 510. The memory 504, such as a random access memory (RAM) or any other dynamic storage device, stores information including processor instructions for creating a multi-device media presentation. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of processor instructions. The computer system 500 also includes a read only memory (ROM) 506 or any other static storage device coupled to the bus 510 for storing static information, including instructions, that is not changed by the computer system 500. Some memory is composed of volatile storage that loses the information stored thereon when power is lost. Also coupled to bus 510 is a non-volatile (persistent) storage device 508, such as a magnetic disk, optical disk or flash card, for storing information, including instructions, that persists even when the computer system 500 is turned off or otherwise loses power.

Information, including instructions for creating a multi-device media presentation, is provided to the bus 510 for use by the processor from an external input device 512, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 500. Other external devices coupled to bus 510, used primarily for interacting with humans, include a display device 514, such as a cathode ray tube (CRT), a liquid crystal display (LCD), a light emitting diode (LED) display, an organic LED (OLED) display, a plasma screen, or a printer for presenting text or images, and a pointing device 516, such as a mouse, a trackball, cursor direction keys, or a motion sensor, for controlling a position of a small cursor image presented on the display 514 and issuing commands associated with graphical elements presented on the display 514, and one or more camera sensors 594 for capturing, recording and causing to store one or more still and/or moving images (e.g., videos, movies, etc.) which also may comprise audio recordings. In some embodiments, for example, in embodiments in which the computer system 500 performs all functions automatically without human input, one or more of external input device 512, display device 514 and pointing device 516 may be omitted.

In the illustrated embodiment, special purpose hardware, such as an application specific integrated circuit (ASIC) 520, is coupled to bus 510. The special purpose hardware is configured to perform operations not performed by processor 502 quickly enough for special purposes. Examples of ASICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a one-way or two-way communication coupling to a variety of external devices that operate with their own processors, such as printers, scanners and external disks. In general the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends or receives or both sends and receives electrical, acoustic or electromagnetic signals, including infrared and optical signals, that carry information streams, such as digital data. For example, in wireless handheld devices, such as mobile telephones like cell phones, the communications interface 570 includes a radio band electromagnetic transmitter and receiver called a radio transceiver. In certain embodiments, the communications interface 570 enables connection to the communication network 105 for creating a multi-device media presentation to the UE 101.

The term "computer-readable medium" as used herein refers to any medium that participates in providing information to processor 502, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 508. Volatile media include, for example, dynamic memory 504. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 520.

Network link 578 typically provides information communication using transmission media through one or more networks to other devices that use or process the information. For example, network link 578 may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590.

A computer called a server host 592 connected to the Internet hosts a process that provides a service in response to information received over the Internet. For example, server host 592 hosts a process that provides information representing video data for presentation at display 514. It is contemplated that the components of system 500 can be deployed in various configurations within other computer systems, e.g., host 582 and server 592.

At least some embodiments of the invention are related to the use of computer system 500 for implementing some or all of the techniques described herein. According to one embodiment of the invention, those techniques are performed by computer system 500 in response to processor 502 executing one or more sequences of one or more processor instructions contained in memory 504. Such instructions, also called computer instructions, software and program code, may be read into memory 504 from another computer-readable medium such as storage device 508 or network link 578. Execution of the sequences of instructions contained in memory 504 causes processor 502 to perform one or more of the method steps described herein. In alternative embodiments, hardware, such as ASIC 520, may be used in place of or in combination with software to implement the invention. Thus, embodiments of the invention are not limited to any specific combination of hardware and software, unless otherwise explicitly stated herein.

The signals transmitted over network link 578 and other networks through communications interface 570, carry information to and from computer system 500. Computer system 500 can send and receive information, including program code, through the networks 580, 590 among others, through network link 578 and communications interface 570. In an example using the Internet 590, a server host 592 transmits program code for a particular application, requested by a message sent from computer 500, through Internet 590, ISP equipment 584, local network 580 and communications interface 570. The received code may be executed by processor 502 as it is received, or may be stored in memory 504 or in storage device 508 or any other non-volatile storage for later execution, or both. In this manner, computer system 500 may obtain application program code in the form of signals on a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to a signal on an infra-red carrier wave serving as the network link 578. An infrared detector serving as communications interface 570 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502.

FIG. 6 illustrates a chip set or chip 600 upon which an embodiment of the invention may be implemented. Chip set 600 is programmed to create a multi-device media presentation as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of providing user interface navigation information associated with the availability of functions. Chip set or chip 600, or a portion thereof, constitutes a means for performing one or more steps of creating a multi-device media presentation.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 600 includes merely one or more processors and some software and/or firmware supporting and/or relating to and/or for the one or more processors.

Figure 7:
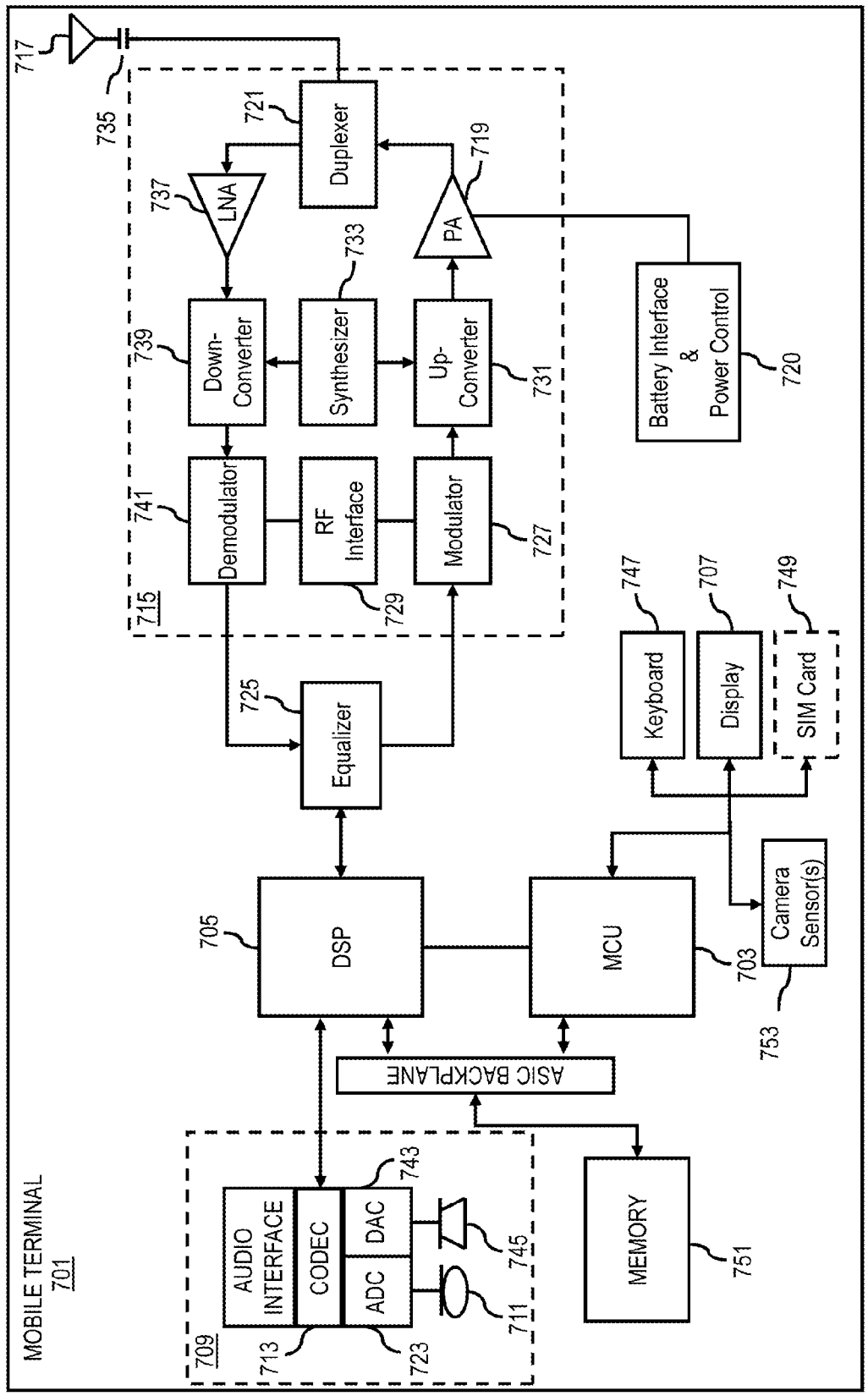
FIG. 7 is a diagram of a mobile terminal (e.g., handset) that can be used to implement an embodiment of the invention.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to create a multi-device media presentation. The memory 605 also stores the data associated with or generated by the execution of the inventive steps. FIG. 7 is a diagram of exemplary components of a mobile terminal (e.g., handset) for communications, which is capable of operating in the system of FIG. 1, according to one embodiment. In some embodiments, mobile terminal 701, or a portion thereof, constitutes a means for performing one or more steps of creating a multi-device media presentation. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 703, a Digital Signal Processor (DSP) 705, and a receiver/transmitter unit including a microphone gain control unit and a speaker gain control unit. A main display unit 707 provides a display to the user in support of various applications and mobile terminal functions that perform or support the steps of creating a multi-device media presentation. The display 707 includes display circuitry configured to display at least a portion of a user interface of the mobile terminal (e.g., mobile telephone). Additionally, the display 707 and display circuitry are configured to facilitate user control of at least some functions of the mobile terminal. An audio function circuitry 709 includes a microphone 711 and microphone amplifier that amplifies the speech signal output from the microphone 711. The amplified speech signal output from the microphone 711 is fed to a coder/decoder (CODEC) 713.

A radio section 715 amplifies power and converts frequency in order to communicate with a base station, which is included in a mobile communication system, via antenna 717. The power amplifier (PA) 719 and the transmitter/modulation circuitry are operationally responsive to the MCU 703, with an output from the PA 719 coupled to the duplexer 721 or circulator or antenna switch, as known in the art. The PA 719 also couples to a battery interface and power control unit 720.

In use, a user of mobile terminal 701 speaks into the microphone 711 and his or her voice along with any detected background noise is converted into an analog voltage. The analog voltage is then converted into a digital signal through the Analog to Digital Converter (ADC) 723. The control unit 703 routes the digital signal into the DSP 705 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 725 for compensation of any frequency-dependent impairments that occur during transmission though the air such as phase and amplitude distortion. After equalizing the bit stream, the modulator 727 combines the signal with a RF signal generated in the RF interface 729. The modulator 727 generates a sine wave by way of frequency or phase modulation. In order to prepare the signal for transmission, an up-converter 731 combines the sine wave output from the modulator 727 with another sine wave generated by a synthesizer 733 to achieve the desired frequency of transmission. The signal is then sent through a PA 719 to increase the signal to an appropriate power level. In practical systems, the PA 719 acts as a variable gain amplifier whose gain is controlled by the DSP 705 from information received from a network base station. The signal is then filtered within the duplexer 721 and optionally sent to an antenna coupler 735 to match impedances to provide maximum power transfer. Finally, the signal is transmitted via antenna 717 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 701 are received via antenna 717 and immediately amplified by a low noise amplifier (LNA) 737. A down-converter 739 lowers the carrier frequency while the demodulator 741 strips away the RF leaving only a digital bit stream. The signal then goes through the equalizer 725 and is processed by the DSP 705. A Digital to Analog Converter (DAC) 743 converts the signal and the resulting output is transmitted to the user through the speaker 745, all under control of a Main Control Unit (MCU) 703 which can be implemented as a Central Processing Unit (CPU).

The MCU 703 receives various signals including input signals from the keyboard 747. The keyboard 747 and/or the MCU 703 in combination with other user input components (e.g., the microphone 711) comprise a user interface circuitry for managing user input. The MCU 703 runs a user interface software to facilitate user control of at least some functions of the mobile terminal 701 to create a multi-device media presentation. The MCU 703 also delivers a display command and a switch command to the display 707 and to the speech output switching controller, respectively. Further, the MCU 703 exchanges information with the DSP 705 and can access an optionally incorporated SIM card 749 and a memory 751. In addition, the MCU 703 executes various control functions required of the terminal. The DSP 705 may, depending upon the implementation, perform any of a variety of conventional digital processing functions on the voice signals. Additionally, DSP 705 determines the background noise level of the local environment from the signals detected by microphone 711 and sets the gain of microphone 711 to a level selected to compensate for the natural tendency of the user of the mobile terminal 701.

The CODEC 713 includes the ADC 723 and DAC 743. The memory 751 stores various data including call incoming tone data and is capable of storing other data including music data received via, e.g., the global Internet. The software module could reside in RAM memory, flash memory, registers, or any other form of writable storage medium known in the art. The memory device 751 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 749 carries, for instance, important information, such as the cellular phone number, the carrier supplying service, subscription details, and security information. The SIM card 749 serves primarily to identify the mobile terminal 701 on a radio network. The card 749 also contains a memory for storing a personal telephone number registry, text messages, and user specific mobile terminal settings.

Further, one or more camera sensors 753 may be incorporated onto the mobile station 701 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   detecting, by an apparatus, one or more neighboring devices in response to a request to divide a presentation of one or more media files on at least one device into a multi-device presentation of the one or more media files;
   determining, by the apparatus, a subgroup of the at least one device, the one or more neighboring devices, or a combination thereof, to display the multi-device presentation;
   activating, by the apparatus, one or more positioning sensors on devices in the subgroup, to provide sensor information;
   determining, by the apparatus, an order and orientation of the devices in the subgroup based, at least in part, on the sensor information; and
   determining, by the apparatus, an alignment of an adjustment of a layout of the multi-device presentation based, at least in part, on a difference in orientation of the devices in the subgroup,
   wherein the devices in the subgroup remain physically separated.

2. A method of claim 1, wherein the subgroup is determined based, at least in part, on one or more media presentation capabilities of the at least one device and the one or more neighboring devices, the apparatus is embedded in one of the devices in the subgroup, and the method further comprising:
   initiating, by the apparatus, a rebroadcasting of the one or more media files from the one device to the other devices in the subgroup via one or more short range communication channels.

3. A method of claim 1, wherein the subgroup is further determined based, at least in part, a physical proximity, a state of movement, a physical orientation, a radio proximity, an audio-based proximity, or a combination thereof among the at least one device, the one or more neighboring devices, or a combination thereof.

4. A method of claim 1, further comprising:
   activating one or more camera sensors, one or more light sensors, one or more proximity sensors, or a combination thereof for collecting sensor information related to at least one object moving over the subgroup; and
   processing the sensor information to determine an alignment of the subgroup with respect to the layout.

5. A method of claim 1, wherein the alignment of the adjustment of the layout is further based, at least in part, on overlapping portions of the layout.

6. A method of claim 1, further comprising:
   initiating a transmission of a common time-stamp among the sub-group; and
   initiating a synchronization of the multi-device presentation of the one or more media files based, at least in part, on the common time-stamp,
   wherein the transmission of the common time-stamp is performed via an exchange of one or more audio signals, an exchange of one or more radio signals, an alignment of one or more views of one or more camera sensors, or a combination thereof among the subgroup.

7. A method of claim 1, further comprising:
initiating a distribution of the one or more media files among the subgroup via one or more centralized means, one or more distributed means, or a combination thereof,
wherein the adjustment of the layout is based on orientation of at least one of the devices in the subgroup is neither in parallel nor in perpendicular with orientation of one or more other devices in the subgroup.

8. A method of claim 1, further comprising:
initiating a distribution of one or more respective portions of the one or more media files to respective one or more devices of the at least one subgroup based, at least in part, on the layout, the one or more media presentation capabilities, or a combination thereof.

9. A method of claim 1, further comprising:
initiating a transmission of one or more control signals among the subgroup for controlling the multi-device presentation of the one or more media files,
wherein the transmission is performed via one or more short-range wireless communication channels.

10. A method of claim 1, further comprising:
determining one or more changes to the subgroup, the one or more neighboring devices, the one or more media presentation capabilities, or a combination thereof; and
initiating an update to the subgroup, the layout, or a combination thereof based, at least in part, on the one or more changes,
wherein the multi-device presentation is caused to end, when one or more of the devices in the subgroup become unavailable.

11. An apparatus comprising:
at least one processor; and
at least one memory including computer program code for one or more programs,
the at least one memory and the computer program code configured to, with the at least one processor, cause the apparatus to perform at least the following:
detect one or more neighboring devices in response to a request to divide a presentation of one or more media files on at least one device into a multi-device presentation of the one or more media files;
determine a subgroup of the at least one device, the one or more neighboring devices, or a combination thereof, to display the multi-device presentation;
activate one or more positioning sensors on devices in the subgroup, to provide sensor information;
determine an order and orientation of the devices in the subgroup based, at least in part, on the sensor information; and
determine an alignment of an adjustment of a layout of the multi-device presentation based, at least in part, on a difference in orientation of the devices in the subgroup,
wherein the devices in the subgroup remain physically separated.

12. An apparatus of claim 11, wherein the subgroup is determined based, at least in part, on one or more media presentation capabilities of the at least one device and the one or more neighboring devices.

13. An apparatus of claim 11, wherein the subgroup is further determined based, at least in part, a physical proximity, a state of movement, a physical orientation, a radio proximity, an audio-based proximity, or a combination thereof among the at least one device, the one or more neighboring devices, or a combination thereof.

14. An apparatus of claim 11, wherein the apparatus is further caused to:
activate one or more camera sensors, one or more light sensors, one or more proximity sensors, or a combination thereof for collecting sensor information related to at least one object moving over the subgroup; and
process the sensor information to determine an alignment of the subgroup with respect to the layout.

15. An apparatus of claim 11, wherein the alignment of the adjustment of the layout is further based, at least in part, on overlapping portions of the layout.

16. An apparatus of claim 15, wherein the apparatus is further caused to:
transmit a common time-stamp among the at least one sub-group; and
synchronize the multi-device presentation of the one or more media files based, at least in part, on the common time-stamp,
wherein the transmission of the common time-stamp is performed via an exchange of one or more audio signals, an exchange of one or more radio signals, an alignment of one or more views of one or more camera sensors, or a combination thereof among the subgroup.

17. An apparatus of claim 11, wherein the apparatus is further caused to:
distribute the one or more media files among the subgroup via one or more centralized means, one or more distributed means, or a combination thereof.

18. An apparatus of claim 11, wherein the apparatus is further caused to:
determine one or more respective portions of the one or more media files to distribute to respective one or more devices of the subgroup based, at least in part, on the layout, the one or more media presentation capabilities, or a combination thereof.

19. An apparatus of claim 11, wherein the apparatus is further caused to:
transmit one or more control signals among the at least one group for controlling the multi-device presentation of the one or more media files,
wherein the transmission is performed via one or more short-range wireless communication channels.

20. An apparatus of claim 11, wherein the apparatus is further caused to:
detect one or more changes to the subgroup, the one or more neighboring devices, the one or more media presentation capabilities, or a combination thereof; and
update the subgroup, the layout, or a combination thereof based, at least in part, on the one or more changes,
wherein the multi-device presentation is caused to end, when one or more of the devices in the subgroup become unavailable.

* * * * *